United States Patent
Barnoski et al.

[11] 4,060,308
[45] Nov. 29, 1977

[54] ANGLE SELECTIVE COUPLER FOR OPTICAL FIBERS

[75] Inventors: Michael K. Barnoski; Viktor Evtuhov, both of Pacific Palisades, Calif.

[73] Assignee: Hughes Aircraft Company, Culver City, Calif.

[21] Appl. No.: 601,863

[22] Filed: Aug. 4, 1975

[51] Int. Cl.² .................................. G02B 5/14
[52] U.S. Cl. ........................................ 350/96 C
[58] Field of Search .................. 350/96 C, 96 WG

[56] References Cited

U.S. PATENT DOCUMENTS

| | | | |
|---|---|---|---|
| 3,240,106 | 3/1966 | Hicks | 350/96 B |
| 3,610,727 | 10/1971 | Ulrich | 350/96 WG |
| 3,617,109 | 11/1971 | Tien | 350/96 WG |
| 3,760,297 | 9/1973 | Thompson | 350/96 WG |
| 3,864,019 | 2/1975 | Smolinsky et al. | 350/96 C |
| 3,995,935 | 12/1976 | McCartney | 350/96 C |

OTHER PUBLICATIONS

Ozeki et al., "Tapered Section of Multimode Cladded Fibers as Made Filters & Mode Analyzers" Appl. Phys. Lett., vol. 26, No. 7, Apr. 75.

*Primary Examiner*—Paul A. Sacher
*Assistant Examiner*—Stewart Levy
*Attorney, Agent, or Firm*—G. B. Wood; W. H. MacAllister

[57] ABSTRACT

There is disclosed an angle selective coupler for coupling optical energy into and/or out of optical fibers. The coupler consists of a section of the optical fiber modified in such a way as to allow optical excitation of a plurality of higher order modes of optical transmission, each mode being defined by a given angle of propagation relative to the fiber axis. In one embodiment the coupling section comprises a single strand of glass fiber waveguide which is tapered along its length. The existence of the tapered section allows coupling of radiation from an external source into a given propagation angle in the fiber. In another embodiment no taper is used, but the fiber cladding is etched down to a thin layer and higher index material is deposited over the thin layer. This allows coherent coupling of radiation into one or more higher order modes in the optical fiber as determined by the angle of the incident light beam with respect to the cladding of the fiber. In either embodiment the device uses total internal reflection to function as an angle selective input or output connector for efficient coupling of optical energy into a given propagation angle within the fiber waveguide. The existence of a plurality of such angles permits the coupler to be used in a modal multiplexing duplexer.

5 Claims, 4 Drawing Figures

ANGLE SELECTIVE COUPLER FOR OPTICAL FIBERS

BACKGROUND OF THE INVENTION

The recent development of low loss clad glass fiber by the Corning Glass Company has led to increased interest in the use of such fiber in communications and control systems, particularly those utilizing integrated optics techniques. Such glass fiber is contemplated in many applications to replace copper wire for conduction of signal information. Just as means must be provided for input and output of the electrical signal to copper wire, so also is it necessary to provide optical input and output connections to glass fiber used to conduct signals at optical wavelengths.

One of the advantages of glass fiber over copper cable is its lighter weight. This advantage can be increased if more than one signal path per strand of fiber can be utilized. This is only possible if one can develop a coupling arrangement which provides for a plurality of transmission modes in a single fiber. Duplexing, that is, transmission in both directions on the fiber simultaneously, is also essential to the most economical use of the fiber.

SUMMARY OF THE INVENTION

It is an object of the present invention to provide an angle selective multi-mode fiber waveguide coupler for the simultaneous transmission of a plurality of signals in one or both directions of a fiber glass strand in a communication or control system.

This is achieved in one embodiment by tapering a strand of the step index low loss clad glass fiber which is then immersed in a liquid or other medium whose index of refraction, $n_p$, is higher than the index of refraction, $n_2$ of the glass core of the fiber which in turn is higher than the index of refraction, $n_1$, of the cladding material on the fiber. An optical signal from a laser or other source is then impinged on the tapered section at a predetermined angle such that multiple internal reflections from the cladding in the glass core will produce a predetermined propagation mode defined by an angle of propagation relative to the axis of the fiber which is a function of the angle of incidence. A similar effect can be obtained by thinning the cladding at the point of incidence and replacing it with material of a higher index of refraction. Light signal output at the other end of the fiber is detectable separately for each of the possible plurality of modes within angular ranges defined hereinbelow. The technique may be used for coupling for multimode or single mode propagation in either one or both axial directions in the fiber. That is to say, the coupler may be used simply for one way transmission or in multi-mode duplexing.

In both of the above arrangements light rays which enter the fiber from the side can be trapped by total internal reflection in the core of the fiber. The propagation angle with which the rays propagate in the core can be controlled by controlling the taper angle, the length of the taper, and the refractive indices used.

BRIEF DESCRIPTION OF THE DRAWING

These and other objects, advantages and features of the invention will be more fully apparent from the detailed description below taken with the accompanying drawings in which like reference characters refer to like parts throughout and wherein.

DETAILED DESCRIPTION OF THE DRAWING

Figure 1:
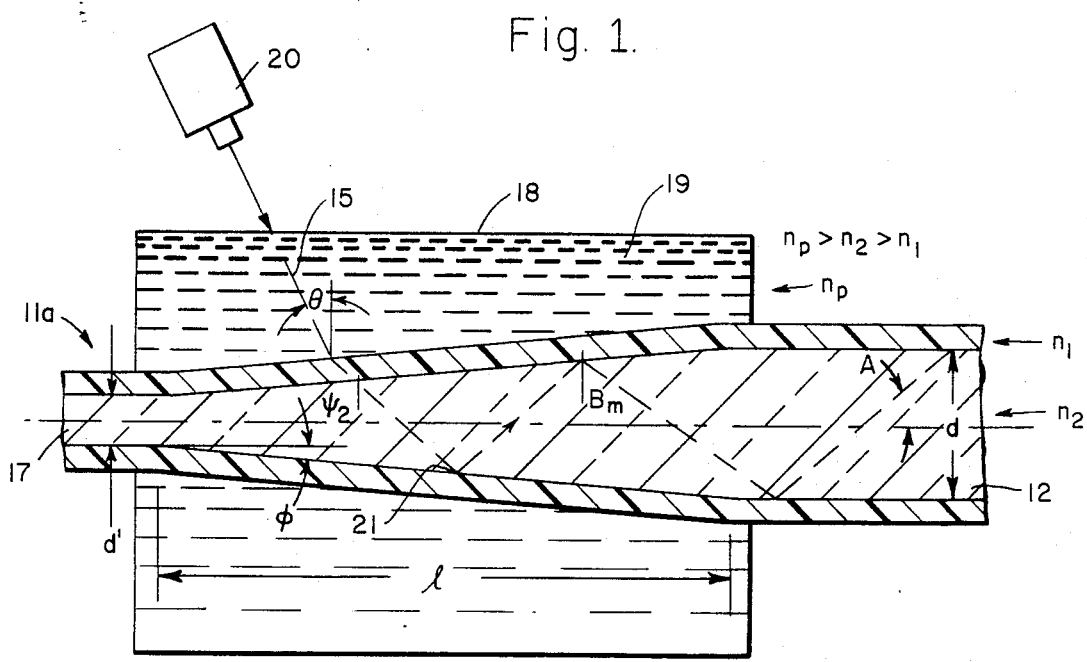
FIG. 1 is a schematic cross sectional view of a tapered fiber illustrating the geometrical principles involved in the propagation of a central ray in accordance with the present invention.

In FIG. 1 there is shown a schematic illustration of the tapered fiber modal coupler. This comprises a strand of step index "Corning" low loss fiber having a tapered section 11a of length $l$ at least an input portion of which is immersed in a fluid 18 whose index of refraction, $n_p$, is higher than that, $n_2$, of the core 12 of the strand. The index of refraction, $n_1$, of the clad 13 of the strand is in turn less than that of the core.

It will be noted from FIG. 1 that the tapered section is drawn in such a fashion that the diameter, $d$, of the standard core section 12 is reduced in value at the other end of the taper to a lesser value, $d'$. In such an arrangement where the refractive index, $n_p$, of the external medium is greater than the refractive index, $n_p$, of the core which in turn is greater than the refractive index, $n_1$ of the clad, it can be shown that light rays which enter the fiber from the side along a path 15, which makes an angle $\theta$ with the normal 16 to the cladding of the fiber, can be trapped by total internal reflection in the core. The propagation angle, A, with which the rays propagate in the core with respect to the longitudinal axis of the fiber after leaving the tapered section can be controlled by controlling the taper angle, $\phi$, of the tapered section 11a, and the length, $l$, of the tapered section.

In FIG. 1 a ray of light from laser 20 impinges along the path 15 through an external medium of controlled index of refraction, $n_p$, which medium is contained in any suitable transparent housing 18. The ray of light along path 15 makes an angle $\theta$ with the normal 16 to the cladding 13 on the core 12. At the interface, $n_p - n_1$, between the medium 18 and the clad 13 the light is refracted in accordance with Snell's law. The light is again refracted at the interface $n_1 - n_2$ between the clad 13 and the core 12 so that it leaves the clad at an angle, $\psi_2$, to the normal to the surface of the clad 13. The light is transmitted angularly across the core and is reflected from the opposite surface of the clad-core interface. This process continues a number of times. Each time the angle of incidence and reflection is changed by virtue of the taper until the light by such progressive reflections has left the tapered section 11a of the core and enters its uniform or non-tapered section at an angle of propagation, A, between it and the longitudinal axis 17 of the core and the path of the light propagation.

In FIG. 1 it follows from Snell's law that the ratio of the sin $\theta$ to sin $\psi_2$ is equal to the ratio of $n_2$ to $n_p$. Furthermore, the angle $\beta_m$ between any normal to the cladding in the tapered section and the incident path of the light at that point is given by the expression $\psi_2 + 2m\psi$ where $m$ is an integer equal to the number of bounces the light has undergone in the tapered section.

Again, from well known laws of optics it follows that for total internal reflection to occur at the $n_p - n_1$ interface between the external medium and the cladding it is necessary that the sin $\theta$ be equal to or greater than the ratio of $n_1$ to $n_p$. Similarly, for total internal reflection to occur at the $n_1 - n_2$ interface between the clad and the core it is necessary that sin $\theta$ is equal to or greater than $n_2/n_p (\sin(\sin^{-1}(n_1/n_2) - 2\phi)))$.

In the device shown in FIG. 1 having a taper angle $\phi$ greater than 0, the proper selection of the value of a taper angle $\phi$ can result in a value of sin $\theta$ which is less than the ratio of $n_1$ to $n_p$ for the first bounce or reflection from point 21 where the value of $m$ is by definition equal to 1 and all bounces thereafter where $m$ is greater than 1. For light entering the fiber from the material 18 of index $n_p$ at the angle $\theta$, the final launch angle A into the untapered fiber will depend, for a given taper angle $\phi$, on the number of bounces $m$ which in turn depends on the length $l$ of the tapered section. When the taper angle $\phi$ is selected to make sin $\theta$ less than the ratio of $n_1$ to $n_p$ for the first bounce, total internal reflection will not occur at the $n_p - n_1$ interface between the external medium and the clad, but total internal reflection will occur at the clad-core interface, $n_1 - n_2$, for all values of $m$.

The device is reciprocal and hence can be used for both input and output coupling. Furthermore, more than one mode can be established simultaneously in either or both directions by establishing a plurality of values of the launch angle A for different inputs.

Figure 2:
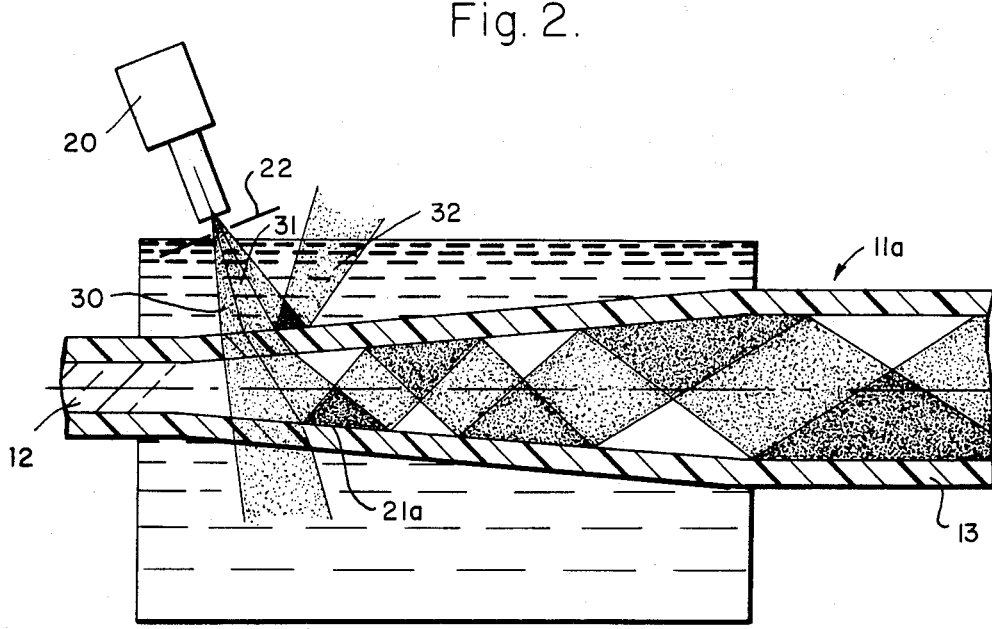
FIG. 2 is a view similar to FIG. 1 illustrating the selective propagation from a yet wider bundle of rays.

The results of these criteria with respect to total internal reflection are diagramatically illustrated in FIG. 2 wherein the tapered portion of the clad glass fiber is reproduced. It will be seen that a diverging beam of light from source 20 passing through an aperture 22 and impinging on the tapered section 11a may be divided into three portions 30, 31, and 32. A first outermost portion 30 of the beam from laser 20 after leaving the aperture 22 impinges on the cladding 13 at an angle $\theta$ such that the rays exceed the total internal reflection angle at both their first and second encounter with the $n_2 - n_1$ core-clad interface and hence pass on through the fiber strand. The second outer portion 32 of the beam makes an angle of impingement $\theta$ with the clad 13 such that these rays undergo total internal reflection at their encounter with the $n_p - n_1$ interface and hence never enter the core 12. The rays in the central section 31 of the beam from laser 20 impinge on the cladding at an angle $\theta$ such that these rays undergo total internal reflection only at surface 21a of the $n_2 - n_1$ core-clad interface and hence are trapped in the core. These rays are refracted and enter the core on their first encounter with $n_1 - n_2$ but are totally internally reflected at all encounters with $n_2 - n_1$ thereafter.

Using $N$ and $n$ interchangeably and $M$ and $m$ interchangeably, the allowed range in launch angle $A$ can be shown to be $$90° - \sin^{-1}(N_1/N_2) - (2M-1)\phi < A < 90° - \sin^{-1}(N_1/N_2)$$

The corresponding range in angle $\theta$ is $$\sin^{-1}(N_2/N_p \sin[\sin^{-1}N_1/N_2 - 2\phi]) < \theta < \sin^{-1}(N_1/N_p)$$

The range of angles (A) launched into the fiber depends upon the design parameters $\phi$ (taper angle) and $m$ (number of bounces which depends on taper length). The in-line insertion loss of such a coupler depends on the taper angle $\phi$. The greater the taper angle the greater the insertion loss.

One numerical example is as follows:

$\phi = \frac{1}{2}°$
$n_1 = 1.487$
$n_2 = 1.50$
$n_p = 2.00$

| | | |
|---|---|---|
| $6.05° \leq A \leq 7.55°$ | $47.8 \leq \theta \leq 48$ | $m = 1$ |
| $5.05° \leq A \leq 7.55°$ | $47.8 \leq \theta \leq 48$ | $m = 2$ |
| $4.05° \leq A \leq 7.55°$ | $47.8 \leq \theta \leq 48$ | $m = 3$ |
| $3.05° \leq A \leq 7.55°$ | $47.8 \leq \theta \leq 48$ | $m = 4$ |

In one experimental arrangement used to demonstrate input coupling the tapered section was formed in Corning Glass Company low loss fiber having a loss of 12dB/km at 820 micrometers. The fiber was a step index fiber with an 85 micrometer core diameter and an overall diameter of 125 micrometers. The index matching fluid 19 was diiodomethane with a listed refractive index $n_p = 1.74$. The tapered section 11a had a taper angle $\phi$ of approximately 0.5°. The laser 20 was a helium neon laser whose beam in the fluid 19 was incident on the cladding of the tapered fiber at an angle $\theta$ approximately equal to 58°. Light coupling occurred as was evidenced by a cone of radiation emanating from the larger diameter end of the fiber. The observed radiation pattern had central and peripheral annular high intensity portions. No output from the end of the fiber was observed unless the beam was incident on the tapered portion of the fiber as distinguished from the untapered portion. Since the internal launch angle, A, depends on the number of core-clad reflections, the angular content of the radiation coupled into the fiber can be controlled by controlling where the laser beam is incident on the tapered section. In one experiment it was shown that when the laser beam was directed onto the tapered section near the end of the taper where the fiber is approaching its full diameter, an annular ring is observed emanating from the opposite end of the fiber. By comparison in the same device when the beam was incident on the tapered section near its minimum diameter end a more nearly solid circular pattern emanated with less decrease in the intensity as one approach to the center.

The coupling technique described above allows the possibility of fabricating directional or duplex couplers for systems using single strands of highly multi-mode low loss fibers. Although the tapered coupler has a narrow acceptance angle, its geometry is compatible with that of a gallium arsenide injection laser whose emission strip can be magnified to reduce its angular radiation distribution while simultaneously maintaining the cross sectional area of the radiation beam incident on the tapered coupler less than the cross sectional area of the tapered core.

Figure 3:
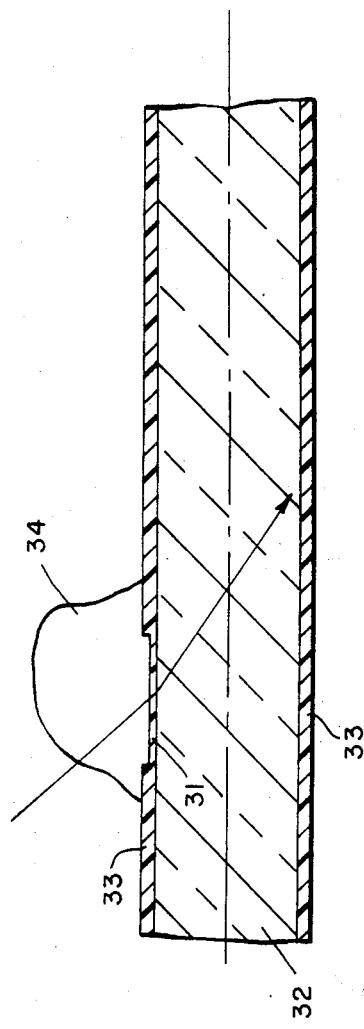
FIG. 3 is a schematic cross sectional view illustrating the present invention as embodied in a non-tapered fiber having a portion of its cladding etched away and replaced by a material of higher index of refraction.

In FIG. 3 there is shown a diagrammatic illustration of a second or alternative embodiment of the device wherein the tapered section is replaced by a section 31 having a cladding of reduced thickness. In this embodiment no taper is used but the normal fiber cladding 33 is etched down to a thin layer 31 and higher index material 34 is deposited over the thin layer. In this device the glass core 32 is provided with a cladding 33 of standard thickness throughout its length except at the etched away reduced portion 31 of the cladding. At this point the material 34 of higher index of refraction, $in_p$, is applied to the strand. Again the light beam is incident at the angle $\theta$ to the normal to the cladding at portion 31. For this embodiment, of course, the taper angle $\phi$ is equal to 0 and for this condition the input angle $\theta$ is such that sin $\theta$ is equal to or greater than the ratio of $n_1$ to $n_p$. With no taper, total internal reflection at the core-clad interface requires that $\theta$ be so large that total internal reflection occurs at the $n_p$- $n_1$ interface. Coupling into the fiber can be achieved by frustrating the $n_p$- $n_1$ total internal reflection. This can be accomplished by selectively etching away part of the clad as at 31 so as to bring the core-clad interface into the evanescent field in the clad resulting from total internal reflection at the $n_p$ - $n_1$ interface.

Figure 4:
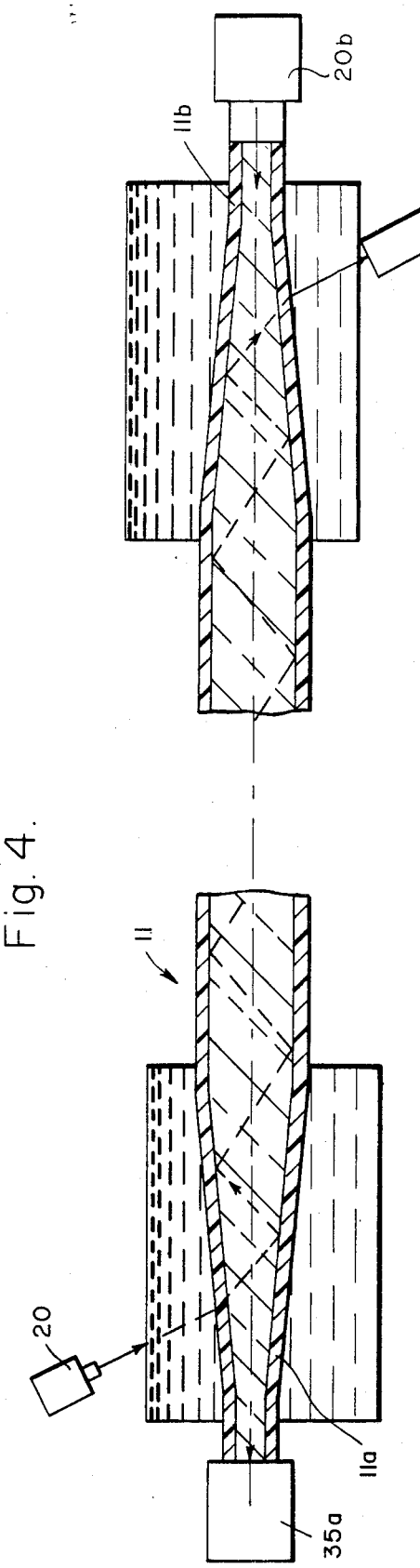
FIG. 4 is a block diagram illustrating one preferred mode of utilization of the present invention.

The block diagram of FIG. 4 illustrates one manner of use of either embodiment of the input-output coupler in a duplexing arrangement. In FIG. 4 it will be seen that the clad glass fiber 11 has a first tapered portion 11a at one end and a second tapered portion 11b of identical configuration but in mirrow image form at the opposite end. The laser 20a impinges a beam of light on the tapered section 11a in the manner discussed above which is transmitted through the fiber and detected by the detector 35b at the opposite end thereof. Simultaneously a laser 20b impinges a beam of light into the tapered portion 11b of the same fiber which beam is transmitted through the fiber in the opposite direction and is detected by the detector 35a. Of course it will be understood that each of the light beams may be modulated to transmit signal information through the fiber for detection at the opposite end. It will be noted that since the device is reciprocal, light entering section 11a from laser 20a at an angle $\theta_1$ will leave section 11b at the same angle $\theta_1$ to pass to detector 35b or to any display, observation, or detection device. Similarly, light entering section 11b at an angle $\theta_2$ will leave section 11a at the same angle $\theta_2$. In FIG. 4 the special case is shown where $\theta_2$ equals 90° so that the beam from laser 20b is directed along the axis of fiber 11 in normal fashion. It will be understood, however, that any other angle meeting the criteria set forth above could be used for $\theta_2$. Such an arrangement in communication or control systems results in a substantial saving in fiber cost and weight since it permits the use of a single fiber for a plurality of simultaneous transmission paths.

What is claimed is:

1. An angle selective fiber optic coupler comprising:
   a. a strand of step index low loss clad glass fiber immersed in a medium whose index of refraction, $n$, is higher than the index of refraction, $n$, of the glass core of said fiber which in turn is higher than the index of refraction, $n_1$, of the cladding material on said glass core of said fiber;
   b. excitation means comprising a modified section of said strand of glass fiber having a tapered core portion with a gradually decreasing thickness along the length thereof for receiving optical energy, said core portion thickness adapted to allow excitation of any one or more of a plurality of orders of modes of optical propagation, each mode being defined by a predetermined angle of propagation relative to the direction of the longitudinal axis of said core of said glass fiber strand measured at a point beyond said modified section; and,
   c. means for impinging a beam of optical radiation through said medium of index $n_p$ and through said modified section and into said core of said strand of glass fiber, the impingement angle of said beam of the cladding of said modified section being preselected to produce said predetermined mode angle of propagation after said beam has traversed said modified section by undergoing one or more total internal reflections therein.

2. A device as in claim 1 wherein said impinging means comprises an optical signal source positioned to have its optical signal directed onto a predetermined point of said modified section of said strand of glass fiber at a predetermined angle, $\phi$, with respect to the normal to the external surface of said cladding at said point.

3. A device as in claim 2 and further including detector means associated with said strand of glass fiber at a point remote from said impinging means for detecting the optical signal transmitted through said fiber.

4. An angle selective fiber optic duplexing circuit coupler comprising:
   a. a strand of step index low loss clad glass fiber immersed in a medium whose index of refraction, $n_p$, is higher than the index of refraction, $n_2$, of the glass core of said fiber which in turn is higher than the index of refraction, $n_1$, of the cladding material on said glass core of said fiber;
   b. first and second optical input coupler means for coupling optical energy into said fiber, said input coupling means being positioned at locations on said fiber remote from each other and each comprising a modified portion of said strand and glass fiber having a tapered core portion with a gradually decreasing thickness along the length thereof, for receiving optical energy said core portion thickness adapted to allow excitation of any one or more of a plurality of orders of modes of optical propagation, each mode being defined by a predetermined angle of propagation relative to the direction of the longitudinal axis of said core of said glass fiber strand measured at a point beyond said modified section;
   c. means associated with each of said input coupling means for impinging a beam of optical energy through each said medium of index $n_p$ and through said modified section and into said core of said strand of glass fiber, the impingement angle of said beam on the cladding of said modified section being preselected to produce said predetermined mode angle of progation after said beam has traversed said modified section by undergoing one or more total internal reflections therein; and
   d. first and second detector means for detecting the optical energy transmitted through said glass fiber from said second and said first impinging means respectively.

5.1 A device as in claim 4 wherein at least one of said impinging means comprises an optical signal source positioned to have its output beam directed onto a predetermined point of said modified section of said strand of glass fiber at a predetermined angle, $\theta$, with the normal to the external surface of said cladding at said point.

* * * * *

UNITED STATES PATENT OFFICE
CERTIFICATE OF CORRECTION

PATENT NO. : 4,060,308
DATED : November 29, 1977
INVENTOR(S) : Michael K. Barnoski et al It is certified that error appears in the above-identified patent and that said Letters Patent are hereby corrected as shown below:

Column 5, line 46 (in Claim 1) "n" should be "$n_p$"

Column 5, line 47 (in Claim 1) "n" should be "$n_2$"

Column 6, line 50 (in Claim 4) "progation" should be "propagation"

Column 6, line 57 (in Claim 5) after "5." delete "1"

Signed and Sealed this

Third Day of April 1979

[SEAL]

Attest:

RUTH C. MASON
Attesting Officer

DONALD W. BANNER
Commissioner of Patents and Trademarks